(12) United States Patent
Kishigami (10) Patent No.: US 9,483,105 B2
(45) Date of Patent: Nov. 1, 2016

(54) COMMUNICATION SYSTEM AND ELECTRONIC CONTROL UNIT

(71) Applicant: DENSO CORPORATION, Kariya, Aichi-pref. (JP)

(72) Inventor: Tomohisa Kishigami, Obu (JP)

(73) Assignee: DENSO CORPORATION, Kariya (JP)

( * ) Notice: Subject to any disclaimer, the term of this patent is extended or adjusted under 35 U.S.C. 154(b) by 58 days.

(21) Appl. No.: 14/661,046

(22) Filed: Mar. 18, 2015

(65) Prior Publication Data

US 2015/0286272 A1 Oct. 8, 2015

(30) Foreign Application Priority Data

Apr. 4, 2014 (JP) ................. 2014-077846

(51) Int. Cl.
*G06F 1/32* (2006.01)
(52) U.S. Cl.
CPC ........... *G06F 1/3287* (2013.01); *G06F 1/3212* (2013.01); *G06F 1/3246* (2013.01)
(58) Field of Classification Search
CPC ... G06F 1/3287; G06F 1/3212; G06F 1/3246
See application file for complete search history.

(56) References Cited

U.S. PATENT DOCUMENTS

| | | | | |
|---|---|---|---|---|
| 7,327,754 B2 * | 2/2008 | Mills | ....................... | H04L 12/12 370/419 |
| 2001/0043353 A1 * | 11/2001 | Iizuka | .................. | G06F 1/3215 358/1.14 |
| 2003/0055942 A1 | 3/2003 | Senoo et al. | | |
| 2003/0220076 A1 * | 11/2003 | Katayama | ......... | H04W 52/0219 455/41.2 |
| 2007/0162675 A1 * | 7/2007 | Sugiura | ..................... | G06F 1/28 710/260 |
| 2008/0098245 A1 * | 4/2008 | Hogan | .................. | G06F 1/3287 713/323 |
| 2013/0185574 A1 * | 7/2013 | Nishikawa | ............ | G06F 1/3296 713/320 |
| 2013/0194897 A1 * | 8/2013 | Kato | ..................... | G04B 99/00 368/66 |

FOREIGN PATENT DOCUMENTS

| | | |
|---|---|---|
| JP | 2004-362068 A | 12/2004 |
| JP | 2005-020570 A | 1/2005 |
| JP | 2007-302058 A | 11/2007 |
| JP | 2008-94508 A | 4/2008 |
| JP | 2010-098477 A | 4/2010 |
| JP | 2014-088150 A | 5/2014 |

* cited by examiner

*Primary Examiner* — M Elamin
(74) *Attorney, Agent, or Firm* — Posz Law Group, PLC (57) ABSTRACT

A communication system operating with a battery is provided. Each node of the system is operable in a sleep mode and a normal mode, outputs a transition availability notice frame indicating whether or not the node is permitted or prohibited to transition to the sleep mode. At least one node is a monitor node. Upon receipt of a transition availability notice frame indicating prohibition of transition to the sleep mode while the battery is in a low voltage state, the monitor node stores sender information in a non-volatile memory, the sender information identifying what node is a sender node sending this transition availability notice frame.

8 Claims, 5 Drawing Sheets

COMMUNICATION SYSTEM AND ELECTRONIC CONTROL UNIT

CROSS REFERENCE TO RELATED APPLICATION

The present application is based on Japanese Patent Application No. 2014-77846 filed on Apr. 4, 2014, disclosure of which is incorporated herein by reference

TECHNICAL FIELD

The present disclosure relates to a communication system that operates with a battery as a power source.

BACKGROUND

Some communications systems, such as an in-vehicle LAN and the like, operate with a battery as a power source. In this system, in order to reduce the power consumption as small as possible, each node of the communication system transitions from a wake-up mode to a sleep mode when operations of the node are unnecessary. The wake-up mode is a normal operation mode. The sleep mode is a mode in which functions except a restart function are stopped.

One method for transition to the sleep mode will be described, which merely provides background information and does not necessarily constitute the prior art. When a node is prohibited from transitioning to the sleep mode, the node periodically notifies this (transition-prohibited notification) to other nodes via a communication line. When the node is permitted to transition to the sleep mode, the node outputs a transition-permitted notification or stops outputting the transition-prohibited notification. When it is confirmed based on these notifications that all the nodes are permitted to transition to the sleep mode, each node switches its operation mode into the sleep node, so that all the nodes transition to the sleep mode substantially at the same time.

In this method, when at least one node continues outputting the transition-prohibited notification due to a failure, a user's improper use or the like, all the nodes cannot transition to the sleep mode. In this case, the battery may run out accordingly.

For addressing this, a proposed technology monitors a battery voltage to prevent the runt out of the battery. When a battery voltage decrease is detected, this decrease is notified or the node is forced to transition to the sleep mode (see Patent Literature 1)

Patent Literature 1: JP-2005-20570A

However, the above technology is provided to merely prevent the run out of the battery. After the battery is actually run out, the cause of the battery run out cannot be identified.

SUMMARY

The present disclosure is made in view of the foregoing. It is an object of the present disclosure to provide a technology that facilities identification of a cause of run out of a battery in a communication system that operates with the battery as a power source.

According to a first example of the present disclosure, a communication system that operates with a battery as a power source is provided. The communication system comprises a plurality of electronic control units each operable in a sleep mode, in which a predetermined function is disabled to save power consumption, and a normal mode, in which the predetermined function is enabled. The plurality of electronic control units function as a plurality of nodes, respectively.

Each node includes a transition availability notification device and a transition execution device. The transition availability notification device outputs a transition availability notice frame to a communication line of the communication system, the transition availability notice frame indicating whether or not the node is permitted or prohibited to transition to the sleep mode. The transition execution device changes an operation mode of the node into the sleep node when confirming based on the transition availability notice frames that all of the nodes connected to the communication line are permitted to transition to the sleep mode.

At least one of the nodes further includes a voltage determination device and a monitor device. The voltage determination device determines whether or not a voltage of the battery is in a low voltage state. The low voltage state is a state in which the voltage of the battery is lower than a predetermined threshold. Upon receipt of the transition availability notice frame indicating prohibition of transition to the sleep mode while the battery is in the low voltage state, the monitor device stores sender information in a non-volatile memory, the sender information identifying what node is a sender node sending the transition availability notice frame indicating the prohibition of transition to the sleep mode.

In the above communication system, the transition-prohibited notice frame (one kind of the transition availability notice frame) indicates that a sender node sending this frame is prohibited from transitioning to the sleep mode. Thus, the sender information stored in the non-volatile memory identifies the node that continues sending the transition-prohibited notice frame despite the decrease in battery voltage below the threshold. Therefore, after the run out of the battery, it becomes possible to identify, based on the sender information read out from the non-volatile memory, the node that was in operation at the occurrence of the run out of the battery, i.e., the node that is possibly a cause of the run out of the battery.

According to a second example of the present disclosure, an electronic control unit functioning as a node of the communication system and comprising the transition availability notification device, the transition execution device, the voltage determination device and the monitor device is provided. According to a third example of the present disclosure, a program stored in a non-transitory tangible storage medium to cause a computer to function as the above electronic control unit is provided.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described with reference to the drawings.

Outline Configuration

Figure 1:
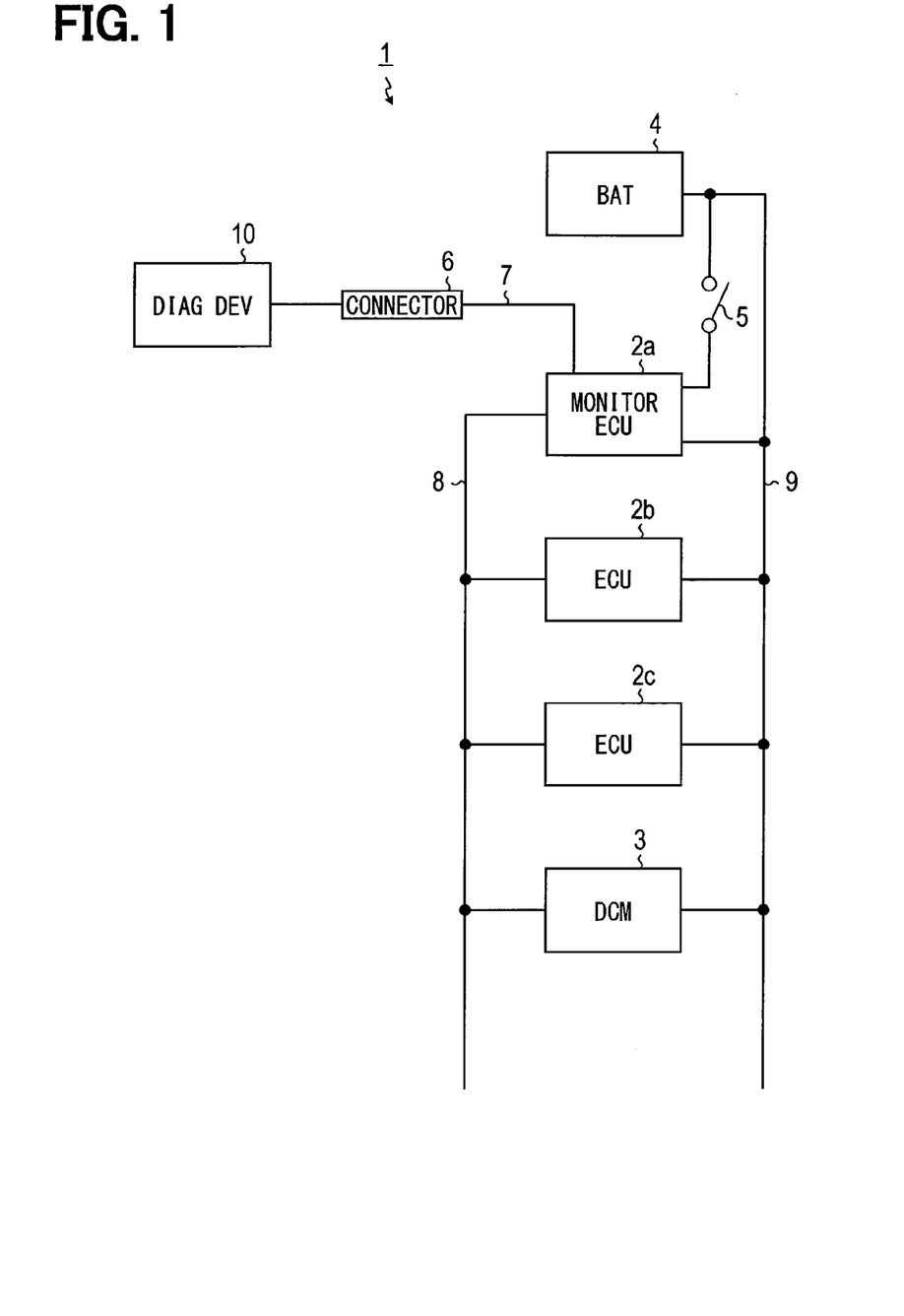
FIG. 1 is a block diagram illustrating a configuration of an in-vehicle communication system.

As shown in FIG. 1, an in-vehicle communication system 1 includes multiple electronic control units (ECUs), a wireless communication apparatus (also called a data communication module (DCM)) 3, a battery 4, an ignition switch (IG switch) 5, and a connector 6. In the following, when the multiple ECUs 2 are distinguished from each other, they may be called an ECU 2a, an ECU 2b, and an ECU 2c.

The ECUs 2a to 2c and the DCM 3 are connected to each other via a communication bus 7. The ECUs 2a to 2c and the DCM 3 function as nodes that perform communications according to a predetermined protocol, which is a CAN protocol in this embodiment. The ECUs 2a to 2c and the DCM 3 are configured to operate by being supplied with electric power from the battery 4 via a power line 9.

The ECUs 2a to 2c perform respective pre-assigned functions. One of the ECUs 2a to 2c, which is the ECU 2a in this embodiment, has a function to monitor an operation condition of the in-vehicle communication system 1 and thus serves as a monitor apparatus (also called a monitor node). This ECU 2a receives a signal indicating ON and OFF of the IG switch 5, and is connected to the connector 6 via the communication bus 7. An external apparatus is detachably connectable to the connector 6. The external apparatus may be a diagnosis apparatus 10, which acquires various kinds of information from the in-vehicle communication system 1 in order to, for example, diagnose the vehicle.

The DCM 3 performs wireless communications through a public wireless communication network.

The battery 4 is mounted to the vehicle and supplies the electric power with a constant voltage.

The IG switch 5 switches over ON and OFF of electric power supply to electrical equipment in an engine-startup state and an engine-stop state. In this embodiment, the on state of the IG switch 5 represents that the engine is in operation. The off state of the IG switch 5 represents that the engine is in a stop state.

ECU

Figure 2:
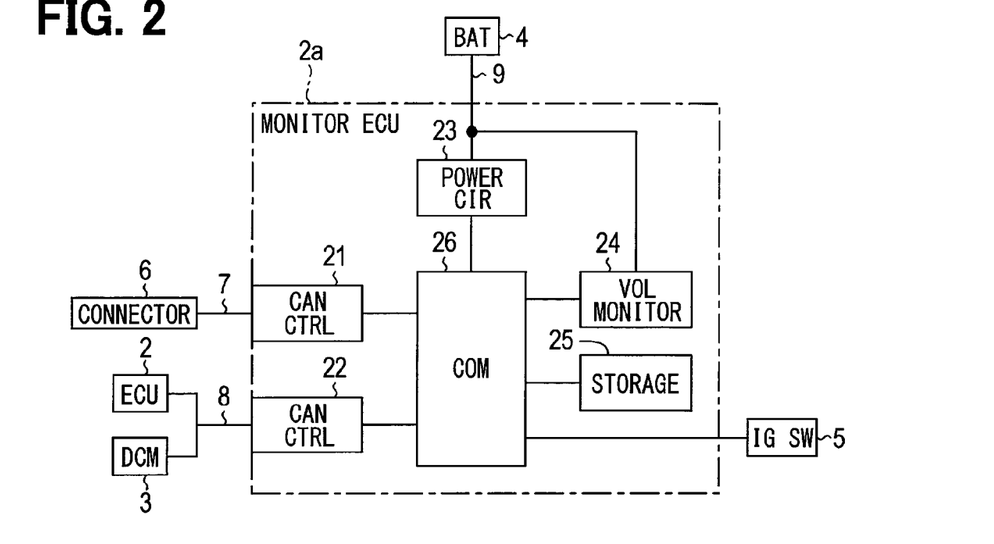
FIG. 2 is a block diagram illustrating a configuration of an electronic control unit (ECU) serving as a monitor apparatus.

As shown in FIG. 2, the ECU 2a includes two CAN controllers 21, 21, a power supply circuit 23, a voltage monitor device 24, a storage device 25, and a microcomputer 26. The CAN controllers 21 and 22 perform communications according to the CAN protocol. The CAN controller 21 is connected to a communication line, which leads to the connector 6. The CAN controller 21 is used for communications with the external apparatus connected to the connector 6. The CAN controller 22 is connected to the communication bus 7 and used for communications with other ECUs 2 and the DCM 3.

The power supply circuit 23 converts the battery voltage (12V typically), which is supplied from the battery 4, into a feeding voltage (e.g., 5V, 3.3V) as required in each part of the ECU 2a. The power supply circuit 23 supplies the feeding voltage to each part of the ECU 2a.

The voltage monitor device 24 monitors the battery voltage of the battery 4. To the microcomputer 26, the voltage monitor device 24 outputs a voltage detection signal indicating whether or not the battery voltage is larger than a threshold voltage Vth. The threshold voltage Vth is a predetermined margin (e.g., 2V) plus a lower limit (e.g., 8V) of a normal voltage range in which the power supply circuit normally operates.

The storage device 25 includes a nonvolatile memory, which retains stored contents even when not powered by the power supply circuit 23.

The microcomputer 26 includes a CPU, a ROM, and a RAM. The microcomputer 26 performs various processes based on the voltage detection signal from the voltage monitor device 24, the signal indicating the on and off of the IG switch 5, and information acquired by the communications using the CAN controllers 21 and 22. The processes performed by the microcomputer 26 include not only a process for implementing a function assigned to the subject node (i.e., the node including the microcomputer 24 concerned) but also a state transition process for changing an operation mode of the subject node into the sleep mode, a monitor process for monitoring an operation condition of each ECU 2 connected to the communication bus 8, and an information read process for providing the external apparatus with the contents stored in the storage device 25.

The ECUs 2b, 2c and the DCM 3 may include substantially the same components as the ECU 2a, except the followings. The CAN controller 21, the voltage monitor device 24, the storage device 25, and a port receiving the signal indicating the on and off of the IG switch 5 are omitted from the ECUs 2b, 2c and the DCM 3. The monitor process and the information read process are omitted from processes performed by the CPUs of the microcomputers 26 of the ECUs 2b, 2c and the DCM 3. Each of the ECU 2 and the DCM 3 may further include a configuration for implementing a function assigned to thereto (i.e., assigned to the subject node). For example, the DCM 3 includes a configuration for implementing a wireless communication.

State Transition Process

Figure 3:
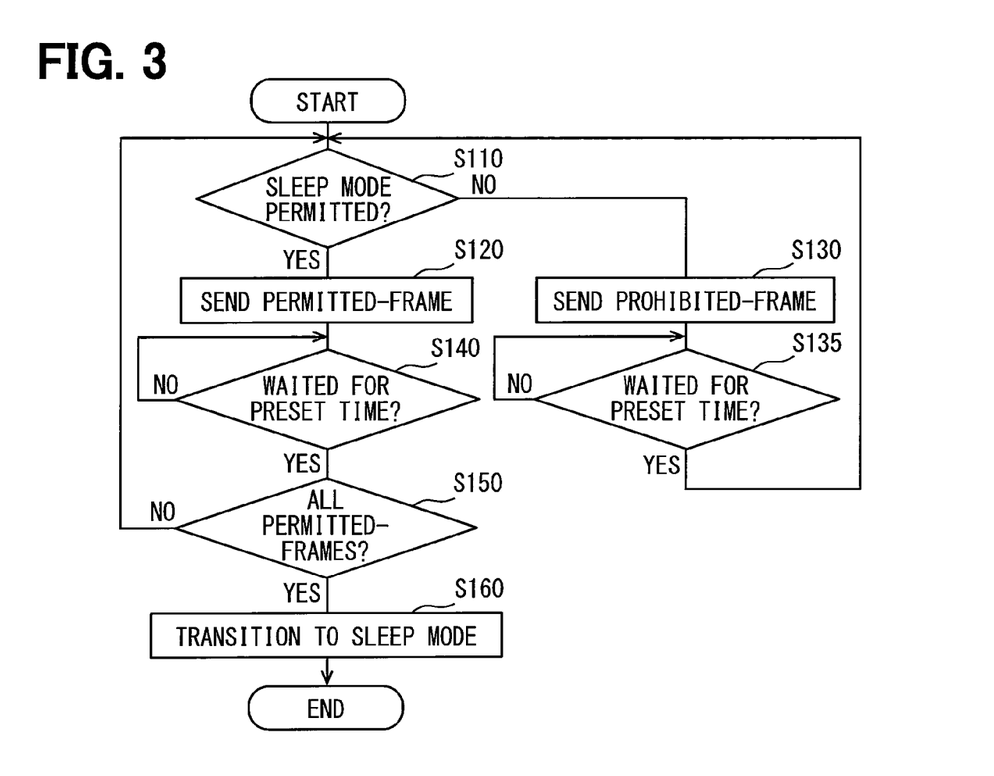
FIG. 3 is a flow chart illustrating a state transition process performed by an ECU.

The state transition process performed by the CPU of the microcomputer 26 will be described with reference to the flow chart of FIG. 3.

The state transition process is performed when the operation modes of all the nodes (the ECUs 2 and the DCM 3) are the wakeup mode.

First, at S110, the CPU of the microcomputer 26 determines whether or not the subject node (the ECU 2 or the DCM 3 performing this state transition process) is permitted to transition to the sleep mode. Specifically, when the process for implementing the function assigned to the subject node is not required in the present condition, the CPU determines that the subject node is permitted to the sleep mode.

When the subject node is not permitted to transition to the sleep mode (NO at S110), the process proceeds to S130. At S130, the CPU sends a transition-prohibited notice frame via the CAN controller 22 indicating that the transition to the sleep mode is prohibited. The transition-prohibited notice frame is one kind of a transition availability notice frame indicating whether the transition to the sleep mode is permitted or prohibited. At S135, the CPU waits for a predetermined time period corresponding to a sending cycle of the transition availability notice frame, and then returns to S110.

When the subject node is permitted to transition to the sleep mode (YES at S110), the process proceeds to S120. At S120, the CPU sends a transition-permitted notice frame via the CAN controller 22 indicating that the transition to the sleep mode is permitted. The transition-permitted notice frame is one kind of the transition availability notice frame. At S140, the CPU waits for the predetermined time period corresponding to the sending cycle of the transition availability notice frame, and then proceeds to S150.

The transition availability notice frame (transition-prohibited notice frame or transition-permitted notice frame) has a CAN-ID, which is unique on a sender-node basis (ECU basis) and enables identification of the sender node.

At S150, the CPU determines whether or not all of the transition availability notice frames received during the waiting time period, including the transition availability notice frame sent from the subject node, are the transition-permitted notice frames.

When at least one of the received transition availability notice frames is the transition-prohibited notice frame (NO at S150), the process returns to S110 to repeat S110 to S140. When all the received transition availability notice frames are the transition-permitted notice frames (YES at S150), the process proceeds to S160. At S160, the operation mode of the subject node transitions to the sleep mode, and this process is ended.

Monitor Process

Figure 4:
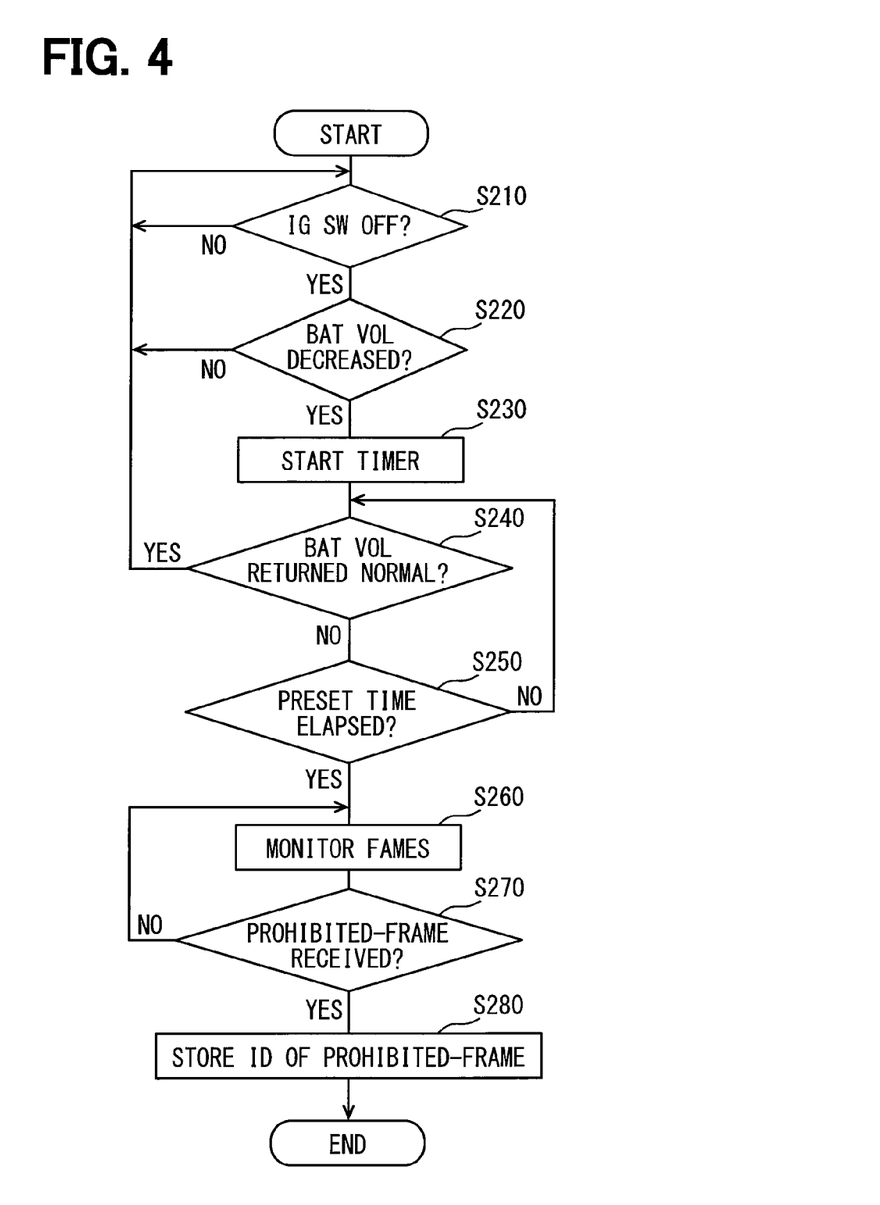
FIG. 4 is a flow chart illustrating a monitor process performed by an ECU serving as a monitor apparatus.

Next, the monitor process will be described with reference to the flow chart of FIG. 4.

The monitor process is performed by the ECU 2a, which functions as the monitor apparatus. The microcomputer 26 performs the monitor process upon starting up.

First, at S210, the CPU of the microcomputer 26 determines whether or not the IG switch 5 is the off state. When the IG switch 5 is not the off state (NO at S210), the CPU waits by repeating S210. When the IG switch 5 is in the off state (YES at S210), the process proceeds to S220.

At S220, the CPU determines whether or not the battery voltage is in a low voltage state based on the detection result of the voltage monitor device 24. The low voltage state is a state in which the battery voltage is less than or equal to the threshold voltage Vth. When the battery voltage is not the low voltage state (NO at S220), the process returns to S210. When the battery voltage is in the low voltage state (YES at S220), the process proceeds to S230. At S230, the CPU starts a timer.

At S240, the CPU determines whether or not the battery voltage returns to a normal state from the low voltage state. When the battery voltage returns to the normal state (YES at S240), the process returns to S210. When the battery voltage is still in the low voltage state (NO at S240), the process proceeds to S250.

At S250, the CPU determines whether or not a predetermined time period has elapsed based on the passage of time of the timer, which was started at S230. It is noted that the predetermined time period is sufficiently longer than a time period during which the battery voltage temporarily falls at a starter operation. When the predetermined time period has not elapsed (NO at S250), the process returns to S240. When the predetermined time period has elapsed (YES at S250), the process proceeds to S250.

At S260, the CPU monitors the transition availability notice frame, which is sent to the communication bus 8 via the CAN controller 22. Upon receipt of the transition availability notice frame, the CPU at S270 determines whether or not the received transition availability notice frame is the transition-prohibited notice frame. When the received transition availability notice frame is not the transition-prohibited notice frame but the transition-permitted notice frame (NO at S270), the process returns to S260. When the received transition availability notice frame is the transition-prohibited notice frame (YES at S270), the process proceeds to S280. At S280, the CAN-ID of the received transition-prohibited notice frame is stored in the storage device 25 as the sender information, which identifies what node is a sender of the received transition-prohibited notice frame.

Information Read-Out Process

Figure 5:
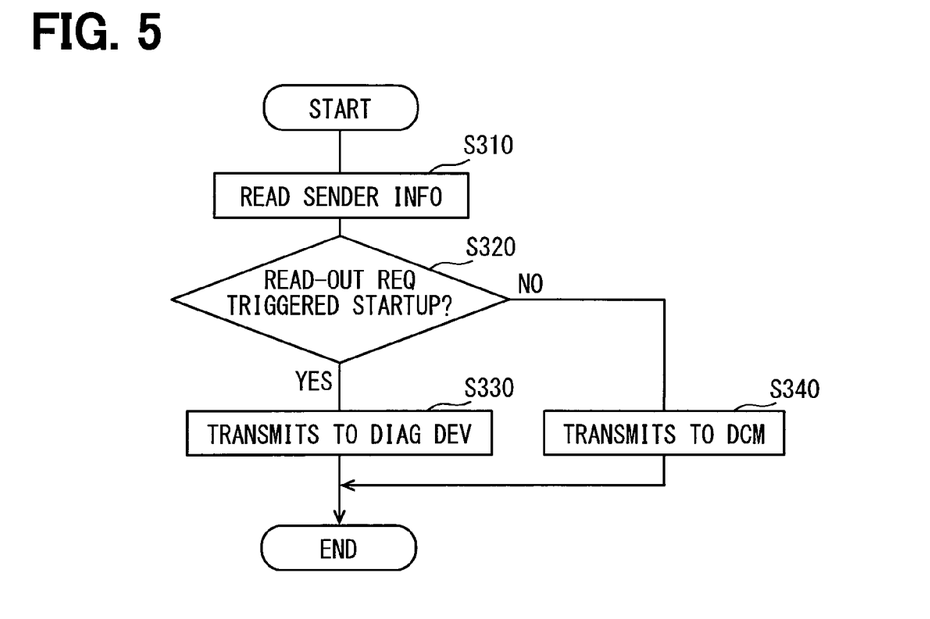
FIG. 5 is a flow chart illustrating an information provision process performed by an ECU serving as a monitor apparatus.

Next, the information read-out process will be described with reference to the flow chart of FIG. 5.

The information read-out process is performed by the ECU 2a, which functions as the monitor apparatus. The microcomputer 24 of the ECU 2a performs the information read-out process upon starting up. Additionally, the microcomputer 24 of the ECU 2a performs the information read-out process upon receipt of a read-out request from the diagnosis apparatus 10 connected to the connector 6.

First, at S310, the CPU of the microcomputer 26 reads the sender information stored in the storage device 25. At S320, the CPU determines whether or not the presently-executed information read-out process is the information read-out process executed based on the read-out request.

When the trigger of the presently-executed information read-out process is the read-out request (YES at S320), the sender information read at S310 is transmitted, via the CAN controller 21, to the diagnosis apparatus 10 connected to the connector 6 and this process is ended. When the trigger of the presently-executed information read-out process is not the read-out request but the startup of the microcomputer 26 (NO at S320), the process proceeds to S340. At S340, the sender information read at S310 is transmitted to the DCM 3 via the CAN controller 22.

Upon receipt of the sender information, the DCM 3 transmits the received sender information to a predetermined destination by wireless communication.

Operations

Figure 6:
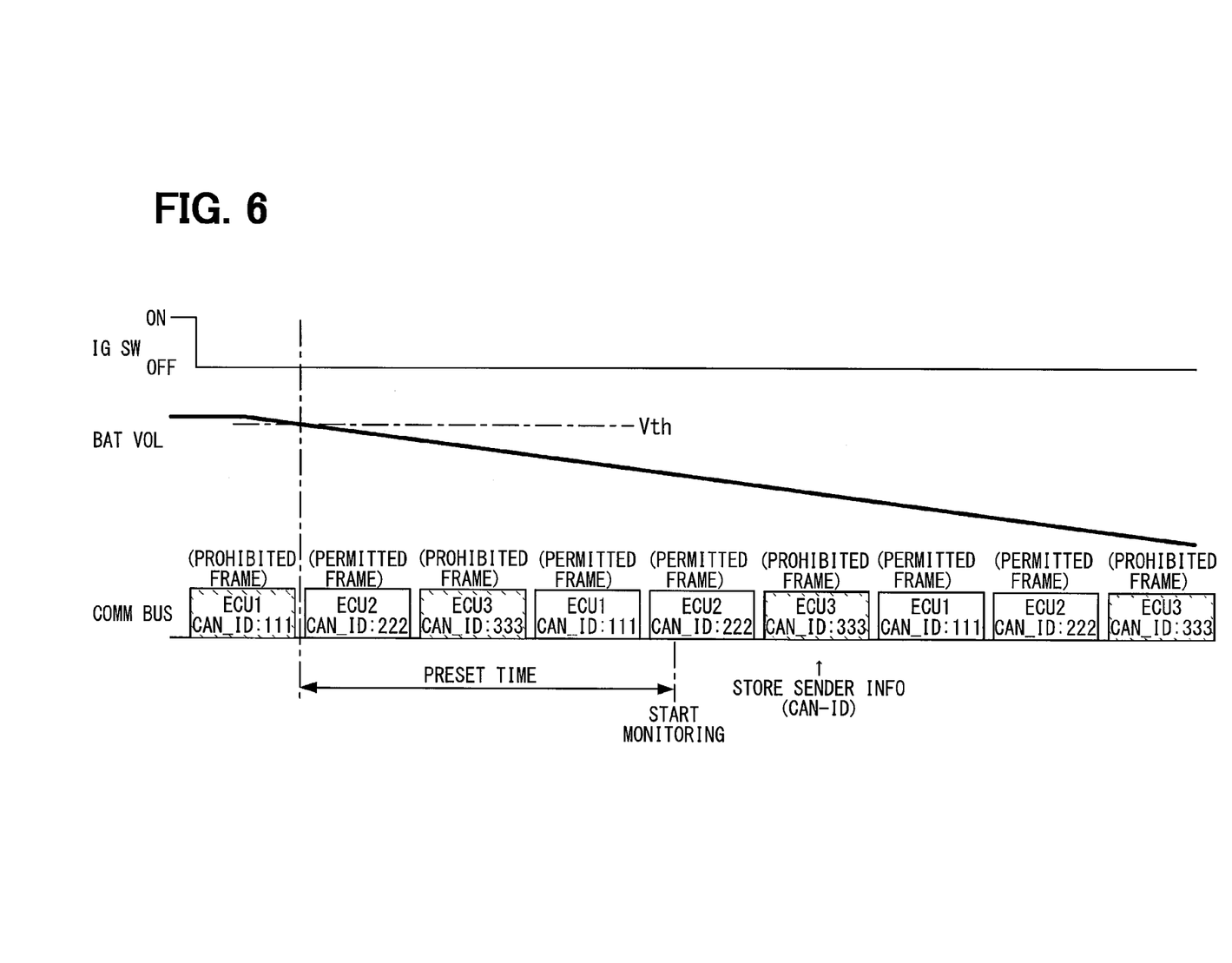
FIG. 6 is a timing chart illustrating operations of an in-vehicle communication system.

As shown in FIG. 6, in the above in-vehicle communication system 1, each node periodically sends the transition availability notice frame (transition-prohibited notice frame, transition-permitted notice frame) to the communication bus 8 to indicate whether or not the node is permitted to transition to the sleep mode.

When the IG switch 5 becomes the off state and the battery voltage falls below the threshold voltage Vth, the timer starts to wait for the predetermined time period. When the predetermined time period has elapsed, the node starts monitoring the transition availability notice frame. Upon receipt of the transition-prohibited notice frame indicating that the transition to the sleep mode is prohibited, the CAN ID of this transition-prohibited notice frame is stored as the sender information.

A reason for storing only the first sender information is to prevent an occurrence of the following situation. The stored data of the storage device 25 is destroyed when, in the course of the writing of the sender information, the battery voltages falls below to a certain voltage that causes the power supply circuit 23 to become inoperable.

The sender information stored in the above way is transmitted to a predetermined destination via the DCM 3 when, for example, the battery 4 is replaced and then the microcomputer 26 is restarted due to the restart of the electric power supply to each node. Thereafter, when the read-out request is inputted from the diagnosis apparatus 10 connected to the connector 6, the sender information is transmitted to the diagnosis apparatus 10 in response to the read-out request.

Technical Effects

In the present embodiment, the transition-prohibited notice frame (one kind of the transition availability notice frame) indicates that a sender node of this frame is prohibited from transitioning to the sleep mode. Thus, the sender information stored in the storage device 25 (non-volatile memory) identifies the node that continues sending the transition-prohibited notice frame despite the decrease in battery voltage to or below the threshold voltage Vth. Therefore, after the run out of the battery, it becomes possible to identify, based on the sender information read out from the storage device 25, the node that was in operation at the occurrence of the run out of the battery, i.e., the node that is possibly a cause of the run out of the battery.

In the present embodiment, the monitoring of the transition availability notice frames is started not immediately after the decrease in battery voltage to the threshold voltage Vth but after the wait for the predetermined time period. Because of this, a temporary battery voltage decrease resulting from normal operations such as cranking is excluded from the monitoring subject. The monitoring subject can be only a continuous battery voltage decrease possibly causing the run out of the battery. Therefore, misidentification is prevented.

Other Embodiments

Embodiments of the present disclosure are not limited to the above-illustrated embodiment but include various embodiments, which will be described below.

(1) In the above embodiment, the sender information can be provided via any of the DCM 3 and the connector 6. Alternatively, the sender information may be provided via either one of the DCM 3 and the connector 6.

(2) In the above embodiment, the ECU 2a functions as the monitor apparatus. Alternatively, multiple ECUs may functions as the monitor apparatuses. In this case, each ECU 2 functioning as the monitor apparatus include at least the input port for obtaining the ON state and the OFF state of the IG switch 5.

(3) In the above embodiment, the CAN-ID is used as the sender information. Alternatively, information including part of the CAN-ID may be used as the sender information.

(4) Elements may not be limited to those in the above embodiments. For example, a function of one element may be distributed to multiple elements. Functions of multiple elements may be integrated into one element. At least part of configurations of the above embodiments may be replaced with other configurations having similar functions. At least part of a configuration of the above embodiment may be added to and/or replaced with a configuration of other embodiments.

In the above embodiments, the microcomputer 26 performing S110 to S130 may correspond to a transition availability notification device. The microcomputer 26 performing S140 to S160 may correspond to a transition execution device. The voltage monitor device 24 may correspond to a voltage determination device. The microcomputer 26 performing S210 to S280 may correspond to a monitor device. The microcomputer 26 performing S310 to S340 may correspond to an information providing device.

What is claimed is:

1. A communication system that operates with a battery as a power source, the communication system comprising:
    a plurality of electronic control units each operable in
        a sleep mode, in which a predetermined function is disabled to save power consumption, and
        a normal mode, in which the predetermined function is enabled,
    wherein:
    the plurality of electronic control units function as a plurality of nodes, respectively;
    each node includes
        a transition availability notification device that outputs a transition availability notice frame to a communication line of the communication system, the transition availability notice frame indicating whether or not the node is permitted or prohibited to transition to the sleep mode, and
        a transition execution device that changes an operation mode of the node into the sleep node when confirming based on the transition availability notice frames that all of the nodes connected to the communication line are permitted to transition to the sleep mode; and
    at least one of the nodes, which is a monitor node, further includes
        a voltage determination device that determines whether or not a voltage of the battery is in a low voltage state, the low voltage state being a state in which the voltage of the battery is lower than a predetermined threshold, and
        a monitor device that, upon receipt of the transition availability notice frame indicating prohibition of transition to the sleep mode while the battery is in the low voltage state, stores sender information in a non-volatile memory, the sender information identifying what node is a sender node sending the transition availability notice frame indicating the prohibition of transition to the sleep mode.

2. The communication system according to claim 1, wherein
    when the low voltage state of the battery continues for a predetermined time period or longer, the monitor device starts to monitor the transition availability notice frame.

3. The communication system according to claim 1, wherein
    the monitor device monitors the transition availability notice frame when confirming that an ignition switch is off or that an engine is off.

4. The communication system according to claim 1, further comprising
    an information providing device that provides an external apparatus with the sender information, which is stored in the non-volatile memory by the monitor device.

5. The communication system according to claim 4, wherein
    when the monitor node, which includes the voltage determination device and the monitor device, starts to be supplied with electric power and starts up, the information providing device transmits the sender information to a predetermined destination via a node having a wireless communication function.

6. The communication system according to claim 4, wherein
the information providing device transmits the sender information to a diagnosis apparatus, which is detachably connectable to the communication line.

7. The communication system according to claim 4, wherein
a communication protocol used in communications via the communication line is a CAN; and
the sender information, which identifies the sender node and is stored in the non-volatile memory, includes a CAN-ID or part of the CAN-ID.

8. An electronic control unit functioning as a monitor node in a communication system that operates with a battery as a power source, the monitor node being one of nodes of the communication system, each node operable in
a sleep mode, in which a predetermined function is disabled to save power consumption, and
a normal mode, in which the predetermined function is enabled,
the electronic control unit comprising:

a transition availability notification device that outputs a transition availability notice frame to a communication line of the communication system, the transition availability notice frame indicating whether transition to the sleep mode is permitted or prohibited;
a transition execution device that changes an operation mode of the subject node into the sleep node when confirming based on the transition availability notice frames that all of the nodes connected to a communication line of the communication system are permitted to transition to the sleep mode;
a voltage determination device that determines whether or not a voltage of the battery is in a low voltage state, the low voltage state being a state in which the voltage of the battery is lower than a predetermined threshold; and
a monitor device that, upon receipt of the transition availability notice frame indicating prohibition of transition to the sleep mode while the battery is in the low voltage state, stores sender information in a non-volatile memory, the sender information identifying what node is a sender node sending the transition availability notice frame indicating the prohibition of transition to the sleep mode.

* * * * *